(12) United States Patent
Strother et al.

(10) Patent No.: US 11,608,463 B2
(45) Date of Patent: Mar. 21, 2023

(54) BIO-DERIVED COMPLEX FOR OIL AND GAS WELL REMEDIATION

(71) Applicant: Richard Strother, Palm Beach, FL (US)

(72) Inventors: Richard Strother, Palm Beach, FL (US); Jeffrey Loch, Celebration, FL (US); Robert Stepan, Strongsville, OH (US)

(73) Assignee: Richard Strother, Palm Beach, FL (US)

( * ) Notice: Subject to any disclaimer, the term of this patent is extended or adjusted under 35 U.S.C. 154(b) by 0 days.

(21) Appl. No.: 17/682,039

(22) Filed: Feb. 28, 2022

(65) Prior Publication Data

US 2022/0177770 A1    Jun. 9, 2022

Related U.S. Application Data

(63) Continuation-in-part of application No. 16/863,838, filed on Apr. 30, 2020, now abandoned.

(60) Provisional application No. 62/920,478, filed on May 1, 2019.

(51) Int. Cl.
*E21B 37/06* (2006.01)
*C09K 8/524* (2006.01)
*C09K 8/528* (2006.01)

(52) U.S. Cl.
CPC .............. *C09K 8/524* (2013.01); *C09K 8/528* (2013.01); *E21B 37/06* (2013.01); *C09K 2208/10* (2013.01)

(58) Field of Classification Search
None
See application file for complete search history.

(56) References Cited

U.S. PATENT DOCUMENTS

2020/0385628 A1* 12/2020 Strother ................. C09K 8/528

* cited by examiner

*Primary Examiner* — Andrew Sue-Ako
(74) *Attorney, Agent, or Firm* — Dragon Sun Law Firm, PC; Jinggao Li; Nathaniel Perkins

(57) ABSTRACT

The present invention relates to a method for oil and gas well remediation by the creation and use of a bio-derived nano scale complex mixtures, comprising bio-derived solvents and/or surfactants that allows the breaking, dissolving, dispersing and caging of obstructions in oil and gas wells. The charge present on the bio derived nanoscale complex is based on the pH of the well. The invention further reduces the well obstructions to a free-flowing fluid and then encapsulates them in an electrochemical, spherical, globe of protection. The method efficiently removes obstructions from the well to be treated.

10 Claims, 3 Drawing Sheets

| Base 1<br>Bio-derived solvents | Base 2<br>Bio-derived solvents |
|---|---|
| Long chain fatty acids derived from renewable lipid feedstocks, including:<br>1. Plant oils<br>2. Vegetable oils<br>3. Citrus oils<br>4. Nut oils | Long chain fatty acids derived from corn oil |

| | Additive |
|---|---|
| | Anti-agglomerating bio-derived chemical additives |

| Base 3<br>Bio-derived surfactants | Base 4<br>Bio-derived organic acids |
|---|---|
| Bio-derived materials that reduces surface tension of a liquid and the interfacial tension between two liquids and/or between a liquid and a solid:<br>1. Nonionic<br>2. Anionic<br>3. Cationic<br>4. Amphoteric | Bio-derived organic compounds with acidic properties that serve as a platform for polymer production, lubrication, coatings and solvents:<br>1. Acetic<br>2. Formic<br>3. Citric<br>4. Lactic<br>5. Succinic<br>6. Gluconic |

FIG. 1

BIO-DERIVED COMPLEX FOR OIL AND GAS WELL REMEDIATION

RELATED APPLICATIONS

This application claims priority under 35 U.S.C. § 119(e) to U.S. Provisional application No. 62/920,478 filed May 1, 2019, entitled "Method and apparatus for the use of remediation fluids", consisting of non-conventional bio-derived nano-scale complex mixtures, including bio-derived bio based/biodegradable solvents/and/or surfactants/and/or emulsifiers that allow the breaking, dissolving, dispersing, and caging of obstructions in oil and gas wells and pipeline, storage and mixing facilities. This application is also a continuation-in-part of U.S. patent application Ser. No. 16/863,838 filed Apr. 30, 2020, entitled "Bio-derived complex for oil and gas well remediation," each of which is incorporated herein by reference in its entirety for all purposes.

FIELD OF THE INVENTION

The present invention relates to a bio-derived nano scale complex and a method for oil and gas well remediation, intervention, well stimulation in well services or well work, both on shore and off-shore. The present invention also relates to well head maintenance and any operation carried out on an oil or gas well during or at the end of its productive life that alters the state of the well fluids, well geometry and oil reservoir. The nano scale complex comprises various combinations of bio surfactants, bio solvents and organic acids.

BACKGROUND OF THE INVENTION

Petroleum, for past many years, has been recovered from subterranean reservoirs through the use of drilled wells and production equipment. Oil and natural gas are found in, and produced from, porous and permeable subterranean formations, or reservoirs. The porosity and permeability of the formation determine its ability to store hydrocarbons, and the facility with which the hydrocarbons can be extracted from the formation. Generally, the life cycle of an oil and/or gas well includes drilling to form a wellbore, casing, cementing, stimulation, and enhanced or improved oil recovery.

In today's world of well maintenance and remediation, conventional matrix acid stimulation is used, wherein conventional acids are pumped into the formation at or below the fracturing pressure and is useful for both sandstone and carbonate reservoirs. The most common acid used is hydrochloric acid (HCl), injected at a typical concentration of 15 wt. %, but can be as high as 28 wt %. However, in high temperature applications, HCl does not produce acceptable stimulation results due to its fast reaction that leads to lack of penetration. As a matter of fact, the reaction is so rapid in high temperatures that it is impossible for the acid to penetrate more than a few inches into the formation. In addition, HCl will not dissolve quartz and alumina silicates found in sandstone reservoirs as these particles (fines) migrate into the pores of the near-wellbore area and can reduce production. Furthermore, acidizing in sandstone reservoirs can create re-precipitation of reaction products that may cause new formation damage.

U.S. Pat. No. 6,399,547 discloses a well treatment fluid comprising hydrochloric acid; water; an aliphatic aldehyde having 1-10 carbon atoms; and an aromatic aldehyde having 7-20 carbon atoms.

Further in prior conventional art, well remediation and well stimulation, the recovery of gas and oil, especially heavy crude oil, the resulting challenges were the high viscosity and vapor pockets. These challenges attenuate the delivery of heavy crude and causes lower yields. The standard remedy is to pump kerosene and/or light oil down to the clogged area. In addition, hexane, toluene, xylene and alcohols are used to mitigate the problem. The down part is that these chemicals are harmful, toxic and damaging to the environment. In addition, these chemicals are very expensive and require special handling. Further to this problem, these materials are not exceptionally effective and can result in a high cost for improved production/oil & gas recovery.

Accordingly, to overcome the disadvantages of the prior art, the present invention discloses innovative technology to alter either the rock permeability or the fluid viscosity in order to produce the oil at commercially competitive rates. In addition to low permeability, it addresses low API (American Petroleum Institute gravity) and high oil viscosity. Moreover, the biodegradable "green" nature of the invention is environmentally friendly and poses no risk to contamination of underground aquifers or drinking water tables.

The non-corrosive invention is safe and non-toxic, containing no volatile organic compounds ("VOCs"), versus toxic level VOCs, deadly chemicals and heavy aromatic distillates that corrode well casing in conventional methodology and persists contaminating the environment with long half-lives. In addition, there is no need for Hazmat Gear, booms and evacuation pumps that conventional methodology requires. The invention is therefore more cost-effective in addition to being environmentally friendly.

BRIEF DESCRIPTION OF THE DRAWINGS

FIG. 1 shows a flowchart for the bases that contribute to one of the embodiments of the present invention.

SUMMARY OF INVENTION

Figure 2:
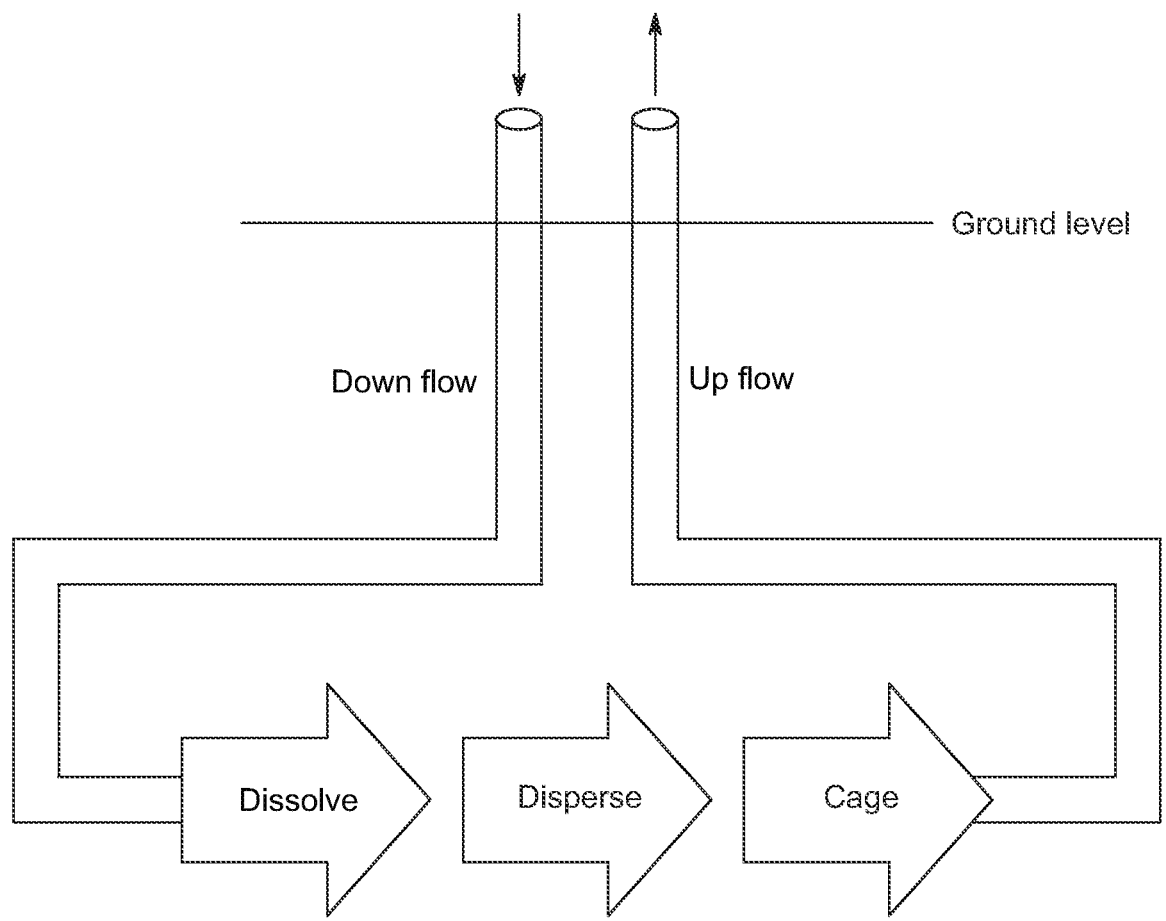
FIG. 2 shows a pictorial view of the method of dissolving, dispersing and caging for removal of obstructions in the well according to the present invention.

Methods and compositions comprising a bio-derived nano scale complex for use in various aspects of the life-cycle of an oil and/or gas well are provided.

In some embodiments, a method of treating a well is provided comprising measuring the pH of the well to be treated, breaking, dissolving, dispersing and caging of obstructions in wells using a bio-derived nano scale complex, wherein the bio-derived nanoscale complex is cationic charged when the pH of the well is less than 7.

In some embodiments, a method of treating a well is provided comprising measuring the pH of the well to be treated, breaking, dissolving, dispersing and caging of obstructions in wells using a bio-derived nano scale complex, wherein the bio-derived nanoscale complex is anionic charged when the pH of the well is greater than 7.

In some embodiments, a method of treating a well is provided comprising measuring the pH of the well to be treated, breaking, dissolving, dispersing and caging of obstructions in wells, wherein dissolving and breaking down an obstruction(s) to their lowest energy form, e.g., sphere takes place using a bio-derived nano scale complex.

In some embodiments, a method of treating a well is provided comprising measuring the pH of the well to be treated, breaking, dissolving, dispersing and caging of obstructions in wells using a bio-derived nano scale complex, wherein dispersing includes dispersing the said spheres to obtain a flowing sphere(s) of dissolved obstructions;

wherein said dispersing is a two-step process comprising (i) flowing of a collection of spheres due to an electrostatic action of a bio-surfactant(s); and (ii) keeping undesirable spheres from agglomerating by negative attractions of the bio-surfactant(s), while the spheres are swept away from well perforations.

In some embodiments, a method of treating a well is provided comprising measuring the pH of the well to be treated, breaking, dissolving, dispersing and caging of obstructions in wells using a bio-derived nano scale complex, wherein caging includes caging the flowing spheres of dissolved obstructions to obtain a segregated cage(s) and sweeping the segregated cages of obstructions to the surface of the well for disposal.

In another aspect, the present invention relates to an environment friendly composition for oil and gas well remediation by creation and use of bio-derived nano scale complex mixtures, including bio-derived/biodegradable solvents and/or surfactants and/or organic acids.

In some embodiments, the nano scale complex is present in a new physio-chemical structure of high thermal stability and chemistry. The complex comprises a mixture of bio-derived solvents which are combined with anti-agglomerating compounds and a variety of surfactants.

In some embodiments, the bio-derived solvents comprise a mixture of fatty acids, wherein the fatty acids are organic carboxylic acids with long aliphatic chains. The fatty acids are saturated (containing only C—C single bonds) fatty acids or unsaturated fatty acids (containing multiple bonds between carbon atoms).

In some embodiments, the surfactant is a bio-derived anionic, and/or nonionic, and/or cationic and/or amphoteric surfactant.

In another embodiment, the anti-agglomerating compounds are selected from unsaturated methyl esters, unsaturated di-substituted amides.

Other aspects, embodiments, and features of the methods and compositions will become apparent from the following detailed description when considered in conjunction with the accompanying drawings. All patent applications and patents incorporated herein by reference are incorporated by reference in their entirety. In case of conflict, the present specification, including definitions, will control.

DETAILED DESCRIPTION

The present invention discloses compositions and methods for oil and gas well remediation by the creation and use of non-conventional bio-derived nano scale complex mixtures, including bio-derived solvents and/or surfactants that allow the breaking, dissolving, dispersing and caging of obstructions in oil and gas wells, pipeline storage and mixing facilities. The bio-derived readily biodegradable nano scale complex mixtures are formulated to allow the breaking and dissolving of any high molecular weight organic matter.

For convenience, certain terms employed in the specification, examples, and appended claims are listed here. However, phraseology and terminology employed herein is for purpose of description and should not be regarded as limiting and one of ordinary skill in the art, given the present specification, would be capable of making and using the presently claimed and disclosed invention in a broad and non-limiting manner.

'Stimulation' refers to the removal of unwanted deposits from the wellbore and production equipment.

'Well stimulation' refers to a well intervention performed on an oil or gas well to increase production by improving the flow of hydrocarbons from the drainage area into the well bore.

'Well remediation' refers to the treatment of geological formations to improve the recovery of hydrocarbons from well damage and arterial blockage caused by the precipitation and deposition of heavy organic molecules from petroleum fluids.

'pH' refers to a figure expressing the acidity or alkalinity of a solution on a logarithmic scale on which 7 is neutral, lower values are more acid and higher values more alkaline. The pH is equal to $-\log 10\ c$, where c is the hydrogen ion concentration in moles per liter.

'Measuring pH of well' refers to measuring the pH of the crude oil and contaminants within the well.

'Well(s)' refers to oil and gas wells, pipeline storage and mixing facilities.

'Nano scale complex' refers to a water-in-oil (W/O), oil-in-water (O/W) and other classes of nano-emulsions which have been found beneficial in drilling, completion, well remediation and other oil and gas industry related operations.

'Surfactants' refers to 'surface-active agents' which are molecules that contain a hydrophilic, or "water-loving" end, and a hydrophobic, or "water-fearing" end.

'Asphaltenes' refers to aromatic-based hydrocarbons of amorphous structure. They are present in crude oils in the form of colloidally dispersed particles. They deposit in near wellbore subterranean formations, in well tubing and perforations, and in transfer lines, storage tanks, surface equipment, pipelines hinder production and transport of high asphaltene crudes from wells.

The nano scale complex of present invention comprises a mixture of fatty acids combined with anti-agglomerating compounds and a variety of bio-derived surfactants and organic acids.

The fatty acids are saturated or unsaturated fatty acids; wherein saturated fatty acids are selected from, but not limited to, palmitic acid, stearic acid etc. and unsaturated fatty acids are selected from, but not limited to, oleic acid, linoleic acid, erucic acid, linolenic acid etc.

The fatty acids are derived from (1) vegetable oils and plant oils including corn, canola, soybean, palm, coconut, safflower, sunflower, rapeseed, cottonseed, and rice oils, (2) nut oils, including peanut, almond, beech, brazil, cashew, hazelnut, macadamia, pecan, pine nut, pistachio, pumpkin seed, and walnut oils; and (3) citrus oils, including lemon, lime and orange oils.

The anti-agglomerating compounds are selected from unsaturated methyl esters, unsaturated di-substituted amides or combinations thereof. The methyl ester and amides act as a solvent and dissolver in well remediation.

The bio-derived surfactants are anionic, nonionic, cationic or amphoteric or combinations thereof. The bio-derived surfactants further include (a) nonionic ethoxylates, alkoxylates and cocamides; (b) anionic compounds, including linear alkyl-benzene sulfonates, alpha-olefin sulfonates and alcohol ether sulfates; (c) cationic compounds; and (d) amphoteric compounds or derivatives thereof.

The bio-derived surfactants reduce the surface tension of a liquid and the interfacial tension between two liquids and/or between a liquid and a solid.

The bio-derived organic acids are selected from, but not limited to, acetic, formic, citric, lactic, succinic and gluconic acids. These bio-derived organic compounds with acidic properties serve as a platform for polymeric substances production, lubrication, coatings and solvents.

In one of the embodiments, the nano scale complex further may optionally comprise one or more of terpenes, furans, ethers, alcohols, alkanes, aromatic phenolics. The terpenes are large and diverse organic compounds with strong aromatics. The furans, ethers, alcohols, alkanes and aromatic phenolics are well-known organic compounds.

The long lasting nano scale complex has a high flash point and retains heat, allowing the product to penetrate beyond the perforations and deep into the formation to repair it without creating new damage, dissolve obstructions, expand/extend the pores, improve permeability (water wet the formation), reduce surface and interfacial tension, to prevent emulsions and to ultimately increase production, thus avoiding the many complex and environmental issues resulting from the usage of toxic acids, including HCl.

Figure 3:
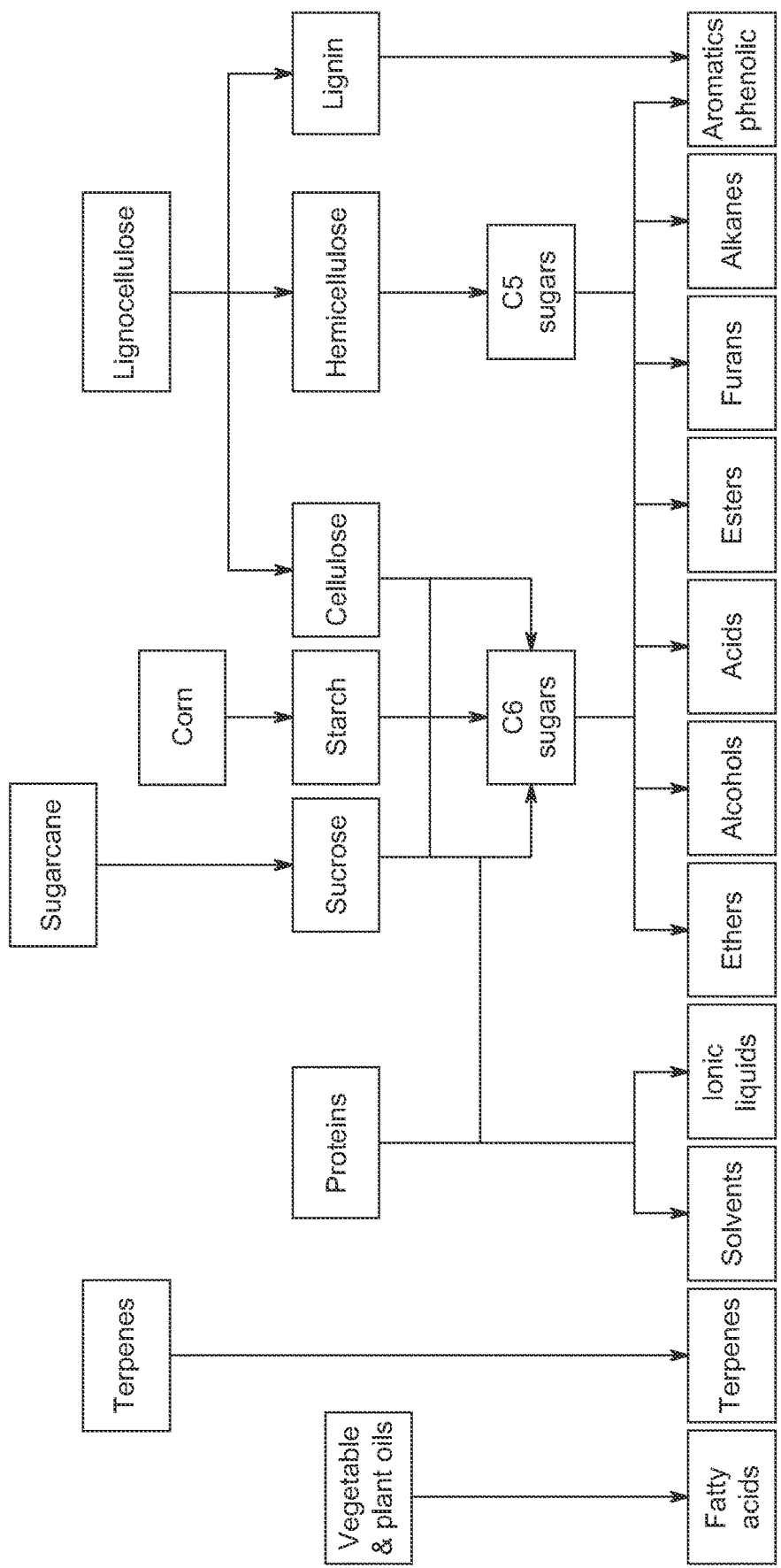
FIG. 3 shows a flowchart methodology for introducing the interrelation of the biodegradable ingredients according to the present invention.

The bio-derived nano scale complex mixtures are formulated in 11 steps as set forth in FIG. 3 to allow the breaking and dissolving any high molecular weight organic matter, which can be applied by one of ordinary skill in the art.

The invention further relates to a method of gas and oil well remediation comprising the step of:

(a) Measuring pH of the well: The pH of well is measured which refers to pH of crude oil and other contaminants within well. If the pH is low, the bio-derived nanoscale complex is cationic (+) charged and if pH is high the bio-derived nanoscale complex is anionic (−) charged.

(b) Dissolving: The invention employs a versatile, broad range molecule in specifically engineered compositions that break down the aromatics, paraffin and asphaltene—literally exploding them apart. This complementary, complex, composition of a bio-derived solvent, surfactant and potent surface acting agent(s) all work in concert to melt and reduce the contaminants to their lowest energy form—a sphere. As part of the naturally occurring separation, the larger spheres gather together in suspension from the smaller spheres.

(c) Dispersing: At this point, due to the electrostatic action of the free energy surface acting agent, the collection of spheres begins flowing. The negative attractions of these agents keep the undesirable spheres from agglomerating while they are swept away from the perforations. The flowing spheres gravitate towards the positive attraction of cages which are composed of sub-micron particles.

(d) Caging: Much like a paperclip that is attracted to a magnet, the flowing spheres of dissolved obstructions become "locked" in a spherical globe of electrochemical protection. These segregated and now harmless cages of hard mineral salts such as calcium, magnesium and other contaminants which are swept to the surface of the well for disposal.

In some embodiments, the bio derived nanoscale complex is cationic (+) charged if the pH of the well is less than 7, wherein the bio derived nanoscale complex is anionic (−) charged if the pH of the well is greater than 7.

In some embodiments, the present invention dissolves obstructions, disperses them into nanoparticles, cages them electrostatically, meanwhile acting in the 24 hour soaking, the perforations and oil reservoir, lubricating them mostly with vegetable oil, then removing or vacuuming the solution into a baker truck for disposal before the well is reopened. Meanwhile, the casing is lubricated by a combination of bio surfactants.

The present invention is, especially, formulated to treat specific precipitation obstructions such as asphaltenes, paraffin and scale within and near the wellbore resulting into improved permeability, shrinked clay swelling, removal of soil film on rocks, restoring of water wet pores and diluting and deconstructing long chain impeding molecules.

The invention further stimulates producing wells of sandstone deposits, carbonate reservoirs and heavy and extra-heavy oil deposits. It is useful in cleaning production pipes and removal of damage in gas fields.

The powerful invention takes solid chemical obstructions in oil and gas wells as well as related transport, blending, and storage facilities and quickly reduces the obstructions to a free-flowing fluid and encapsulating them in an electrochemical, spherical, globe of protection. The sub-micron particles are then corralled, extracted and disposed of, leaving a lubricated casing surface for increased flow and output of crude oil or gas.

Thermal stable methods are used to allow production of exceedingly viscous oil. Such hydrocarbons are called viscous or "heavy oil" as the methods of present invention retain heat, dissolve the obstructions, penetrate deep into the formation and are able to deconstruct the long carbon chains (C:60-C:80) such as asphaltenes. Moreover, the biodegradable "green" nature of the invention is environmentally friendly and poses no risk to contamination of underground aquifers or drinking water tables. Moreover, the invention is "Green" in that it is made from bio-derived, degradable, renewable natural materials with no volatile organic compounds (VOC), no $CO_2$ emissions and no Hazmats protocols normally used in well treatment. It is environmentally friendly and represents no hazard to drinking water tables as it is injected underground into the wells.

According to an embodiment of the invention, the viscosity of heavy crudes with low API's and inoperable transport viscosity can be increased and thus enabling the use of methods of transport heretofore unavailable to such heavy crudes.

In one of the embodiments, once an oil well is vetted for its length, volume and capacity, as well as the well's type of reservoir formation of sand or rock or clays by one of ordinary skill in the art, a balanced composition according to the present invention, i.e. biodegradable and "Green" solvent, surfactant product of nano-particles, is poured down the well bore in order to enhance oil recovery from seasoned oil wells which are under-producing due to obstructions and lack of mobility in the reservoirs.

In another embodiment, organic obstructions (incrustations) such as wax, paraffins, asphaltenes and dirt are formed over time in production pipes, diminishing their diameter, restricting oil flow and in oil reservoirs, restricting pores and channels, causing oil to reduce its movement and flow, consequently diminishing well production. Then, nano scale complex mixtures invade organic obstructions in well production pipes and in oil reservoirs, dissolving them into a free-flowing liquid. Once pores and channels in reservoirs are cleaned, they are also coated so that they cannot easily form incrustations again and this allows oil to flow freely, increasing pressure, permeability and mobility while reducing viscosity, all of which increases oil mobility and can restore oil well production back to its historical "peaks". In essence, it reinvigorates oil reservoirs. The nano scale complex penetrates much deeper into oil reservoirs, lasting many times longer than the currently hazardous toxic, acid and corrosive injection solvents used in the prior art.

The obstructions are dissolved, caged and dispersed (as shown in FIG. 2) and are vacuumed up with the fluids and placed in a holding tank for removal. The well is then put back into service.

In one of the embodiments, the present invention provides a biodegradable nanotechnology fully adjusted to environmental regulations, recovery of the production potential of oil and gas producing wells, cleaning and removal of fillers and incrustations in production pipes, lengthening, and improving the useful life of the well.

In a further embodiment, the nano scale complex that penetrate deep between heavy asphalt and ground earth to efficiently lower the viscosity increases dramatically the yield of heavy organic oil products and also the break up and solubilization of the heavy crude. Additionally, especially reactive biodegradable organic oil derivative is used in the process that works by penetrating the adhesion between the heavy crude and the ground. The process chemically reacts with the heavy crude to enhance bio-derived surfactants in situ. As a result, this increases the ability of the water-based invention to lower the adhesion, surface tension and resulting friction of the heavy crude leads to a more flowable extractable product.

Heavy Crudes with low API's and inoperable transport viscosity can be combined with certain aspects of the invention to increase viscosity and thus be able to use pipelines or other methods of transport unavailable to heavy crudes with low viscosity and tar-like qualities.

The nano scale complex of the present invention increases API by breaking down heavy carbon chains that helps to reduce the viscosity and flowing of obstructions with nano scale complex to the surface of the well. The nano scale complex enhances mobility by reducing the crude oil's density, which in turn, increases the crude oils' API. Unlike severe changes in temperatures which may temporarily achieve the same results, the permanent deconstructing the long chain hydrocarbons (asphaltenes C40-C80) as low API crude oils are typically high in carbon, cracking the resins and releasing the existing toluene and n-heptane once walled off behind the resins subsurface back into the crude. The nano scale complex also breaks down the "water-in-oil" emulsion (water=API 10) while dropping out the solids & salts (all of which add to the crude's viscosity) downhole before flowing up to the surface as a less dense/higher API specific gravity fluid. The results in reduction of density and increase in API specific gravity permanently.

These and other aspects of the present invention will be further appreciated upon consideration of the following Example(s), which are intended to illustrate certain particular embodiments of the invention but are not intended to limit its scope, as defined by the claims.

EXAMPLE 1

Mobility Enhancement Test

The experimental and core conditions are shown in Table 1 to reflect the enhancement in mobility by performing mobility change tests within the porous medium.

TABLE 1

| Core Conditions | | Experimental Conditions | | Initial Differential (%) | Final Differential (%) |
|---|---|---|---|---|---|
| Core type | BEREA | Pore pressure (psi) | 700 | | |
| Sand | UN-consolidated | Confinement pressure (psi) | 1000 | | |
| Porosity (%) | 20 | Transducer calibration (psi) | 500 | | |
| Permeability (mD) | 1000 | Temperature (F.) | 150 | | |
| Depth (pies) | | Overbalance pressure (psi) | | 6.9 | 5.5 |
| Well | PJS05 | Mud injected pressure (psi) | | 6.9 | 5.4 |
| Porous volume (cc) | 20 | Pressure level of plaster (psi) | | 6 | 5.4 |
| Length (cm) | 6 | Injection rate (cc/min) | 1 | 6.8 | 5.3 |
| Diameter (cm) | 3.753 | Fluid 1 (cc) | | 6.7 | 5.3 |
| Area (cm$^2$) | 11.784 | Fluid 1 (cc) | | | |
| | | Fluid 2 (cc) | | | |
| | | Fluid 3 (cc) | | | |

| Observations | |
|---|---|
| Differ. Initial Pressure (psi): 33.5 | Differ. Pressure Final (psi): 26.5 |
| Initial Mobility (md/cp): 3.723 | Mobility Final (md/cp): 5.100 |
| % Damage to the Formation: −31.01% | % Return to Permeability: 131.01% |

Results

The composition of the present invention takes solid obstructions and quickly reduces them to a free-flowing liquid. The sub-micron particles are corralled and then encapsulated in an electrochemical, spherical globe of protection. In other words, the present invention uses electrochemical principles to bring sustainable productivity and good health to the well. Hence, the assortment of products provides full range effectiveness from hard inorganics that would naturally agglomerate and remove them from the well.

CONCLUSION

The results obtained during the tests of mobility within the porous medium, with radial displacement methodology in core subjected to equivalent pore pressure and simulation temperature gave affirmative results, since the fluid system is of direct emulsion type with high physicochemical stability, creates an obvious reaction of ultra-low interfacial tensions, and the incorporation of broad molecular chain organic systems such as heavy and extra heavy crudes, which induces physico-chemically to perform an early stimulation inside and outside the porous medium, which translates into a modification of its mobility, or increase in the speed of displacement of crude oil, within the porous medium, which brings a benefit action at the level of immediate production of the wells treated with the present invention, which is characterized by an electrochemical modification of the system creating a double electric layer by the presence of a mix of surfactants of various natures, which couples in organic modules of long chains, shielding the natural feature inside and outside; wherein the reservoir creates a reaction inside the petro physics of the deposit, and outside of it, in the innate crude itself of formation.

EXAMPLE 2

Effect of Well pH and Charge of Bioderived Nanoscale Complex

A number of bioderived nanoscale complex were prepared wherein the charge of the nanoscale complex is based on the pH of the well to check the displacement of obstructions from the well using the method described above. The results are provided in Table 2.

TABLE 2

| Bio derived nanoscale complex | pH of Well | Charge | Displacement of obstructions |
|---|---|---|---|
| Sample 1 | 3 | Cationic | 80% |
| Sample 2 | 3 | Anionic | 50% |
| Sample 3 | 7 | Non-Ionic | 74% |
| Sample 4 | 7 | Cationic | 65% |
| Sample 5 | 11 | Cationic | 46% |
| Sample 6 | 11 | Anionic | 82% |

Results

The table 2 clearly shows the effect of measuring pH of well and its correlations with the preparation of bio derived nanoscale complex. The cationic charge of the bio derived complex when pH of well is 3 and anionic charge of the bio derived complex when pH of well is 11 efficiently removes the obstructions from the well to be treated.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or lists of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of treating a well comprising:
   (a) Measuring pH of the well to be treated;
   (b) Dissolving and breaking down an obstruction(s) to their lowest energy form, a sphere, using a bio-derived nano scale complex;
      wherein the bio-derived nanoscale complex is cationic charged when the pH of the well is less than 7; and
      wherein the bio-derived nanoscale complex is anionic charged when the pH of the well is greater than 7;
   (c) Dispersing said spheres obtained in step (b) to obtain a flowing sphere(s) of dissolved obstructions;
      wherein said dispersing is a two-step process comprising
      (i) flowing of a collection of spheres due to an electrostatic action of a bio-surfactant(s); and
      (ii) keeping undesirable spheres from agglomerating by negative attractions of the bio-surfactant(s), while the spheres are swept away from well perforations; and
   (d) Caging the flowing spheres of dissolved obstructions to obtain a segregated cage(s) and sweeping the segregated cage(s) of obstructions to the surface of the well for disposal.

2. The method of claim 1, wherein the obstructions are selected from light hydrocarbon condensates, paraffin and asphaltene.

3. The method of claim 1, wherein the obstructions are mineral scales.

4. The method of claim 1, wherein the bio-derived nanoscale complex comprises a first solvent, a second solvent, a bio-surfactant(s) and an organic acid(s).

5. The method of claim 4, wherein the first solvent is saturated fatty acids and wherein said saturated fatty acids are selected from palmitic acid and stearic acid.

6. The method of claim 4, wherein the first solvent is unsaturated fatty acids and wherein said unsaturated fatty acids are selected from oleic acid, erucic acid, linoleic acid.

7. The method of claim 4, wherein the second solvent is derived from a bio-based feedstock.

8. The method of claim 4, wherein the second solvent further comprises an anti-agglomerating additive wherein said anti-agglomerating additive is unsaturated methyl esters.

9. The method of claim 4, wherein the bio-surfactant is selected from group consisting of ethoxylates or derivatives thereof.

10. The method of claim 4, wherein the organic acid is at least one selected from group consisting of acetic, formic, citric, lactic, succinic and gluconic acids.

* * * * *

UNITED STATES PATENT AND TRADEMARK OFFICE
CERTIFICATE OF CORRECTION

PATENT NO. : 11,608,463 B2
APPLICATION NO. : 17/682039
DATED : March 21, 2023
INVENTOR(S) : Jeffrey Loch and Robert Stepan It is certified that error appears in the above-identified patent and that said Letters Patent is hereby corrected as shown below:

On the Title Page

Item (12), delete "Strother et al." and insert --Loch et al.--.

Item (72), should read, Inventors: Jeffrey Loch, Celebration, FL (US) and Robert Stepan, Strongsville, OH (US).

Signed and Sealed this
Twenty-ninth Day of August, 2023

Katherine Kelly Vidal
*Director of the United States Patent and Trademark Office*